United States Patent
Hamabe et al.

(10) Patent No.: US 12,428,010 B2
(45) Date of Patent: Sep. 30, 2025

(54) VEHICULAR DISPLAY CONTROL DEVICE, VEHICULAR DISPLAY DEVICE, VEHICULAR DISPLAY CONTROL METHOD, AND STORAGE MEDIUM

(71) Applicant: TOYOTA JIDOSHA KABUSHIKI KAISHA, Toyota (JP)

(72) Inventors: Ryota Hamabe, Nisshin (JP); Takahiro Hirota, Nukata-gun (JP); Yoshinori Murata, Toyota (JP); Keigo Hori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 17/862,554

(22) Filed: Jul. 12, 2022

(65) Prior Publication Data
US 2023/0058939 A1 Feb. 23, 2023

(30) Foreign Application Priority Data
Aug. 18, 2021 (JP) ................. 2021-133606

(51) Int. Cl.
*B60W 50/14* (2020.01)
*B60K 35/10* (2024.01)
(Continued)

(52) U.S. Cl.
CPC ............ *B60W 50/14* (2013.01); *B60K 35/10* (2024.01); *B60K 35/22* (2024.01); *B60K 35/23* (2024.01);
(Continued)

(58) Field of Classification Search
CPC ........ B60K 35/23; B60K 35/28; B60K 35/00; B60K 35/10; B60K 2360/111;
(Continued)

(56) References Cited

U.S. PATENT DOCUMENTS

| 2008/0209449 A1* | 8/2008 | Maehira | G06F 9/44505 |
| | | | 719/321 |
| 2009/0164062 A1* | 6/2009 | Aoki | B60Q 1/0082 |
| | | | 701/36 |

(Continued)

FOREIGN PATENT DOCUMENTS

| CN | 101432166 A | 5/2009 |
| CN | 112849118 A | 5/2021 |

(Continued)

OTHER PUBLICATIONS

Machine Translation of Description of DE-102007020124-A1, pp. 1-7 (Year: 2007).*

*Primary Examiner* — Anne Marie Antonucci
*Assistant Examiner* — Jared C Bean
(74) *Attorney, Agent, or Firm* — Oliff PLC

(57) ABSTRACT

A vehicular display control device includes a memory; and a processor coupled to the memory, the processor being configured to: acquire a function allocation status of a multifunction switch capable of being allocated any press-implemented function, in order to display an image of a switch array including the multifunction switch on a display device, and display a first symbol in a display region corresponding to the multifunction switch in the switch array image in a case in which the multifunction switch has not been allocated a press-implemented function.

9 Claims, 7 Drawing Sheets

(51) Int. Cl.
*B60K 35/22* (2024.01)
*B60K 35/23* (2024.01)
*B60K 35/50* (2024.01)

(52) U.S. Cl.
CPC ....... *B60K 35/50* (2024.01); *B60W 2050/146* (2013.01); *B60W 2510/20* (2013.01)

(58) Field of Classification Search
CPC ....... B60K 2360/122; B60K 2360/162; B60W 50/14; B60W 2050/146; B60W 2510/20
See application file for complete search history.

(56) References Cited

U.S. PATENT DOCUMENTS

| | | | | |
|---|---|---|---|---|
| 2012/0227028 | A1* | 9/2012 | Pun | G06F 8/38 |
| | | | | 717/108 |
| 2012/0260164 | A1* | 10/2012 | Scheufler | B60K 35/80 |
| | | | | 715/702 |
| 2014/0354045 | A1* | 12/2014 | Snider | B60K 35/23 |
| | | | | 307/10.1 |
| 2017/0300218 | A1 | 10/2017 | Morimoto | |
| 2020/0097233 | A1* | 3/2020 | Ueda | H04L 63/10 |
| 2020/0339174 | A1* | 10/2020 | Sakamaki | B62D 1/046 |
| 2021/0138903 | A1* | 5/2021 | Kozono | B60K 35/28 |
| 2022/0083201 | A1* | 3/2022 | Kozono | H03K 17/962 |
| 2022/0139647 | A1* | 5/2022 | Mizuno | B60R 16/027 |
| | | | | 345/173 |
| 2023/0356595 | A1* | 11/2023 | Kozono | B60K 35/28 |

FOREIGN PATENT DOCUMENTS

| | | | | |
|---|---|---|---|---|
| DE | 102007020124 | A1 * | 11/2007 | ............ B60K 37/06 |
| JP | 2007-290562 | A | 11/2007 | |
| JP | 2016-74315 | A | 5/2016 | |
| JP | 2020-093591 | A | 6/2020 | |
| JP | 2021-075157 | A | 5/2021 | |

* cited by examiner

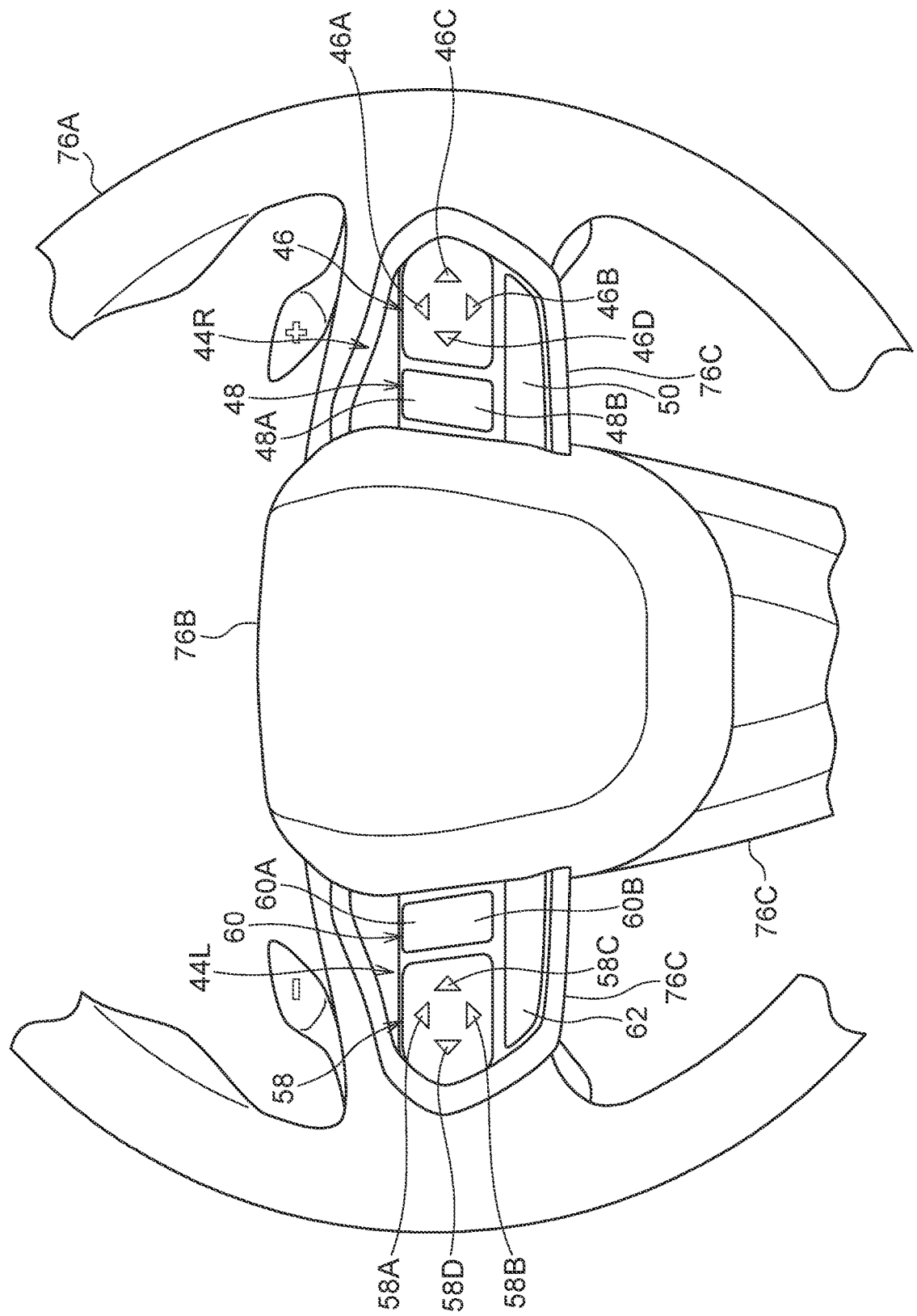

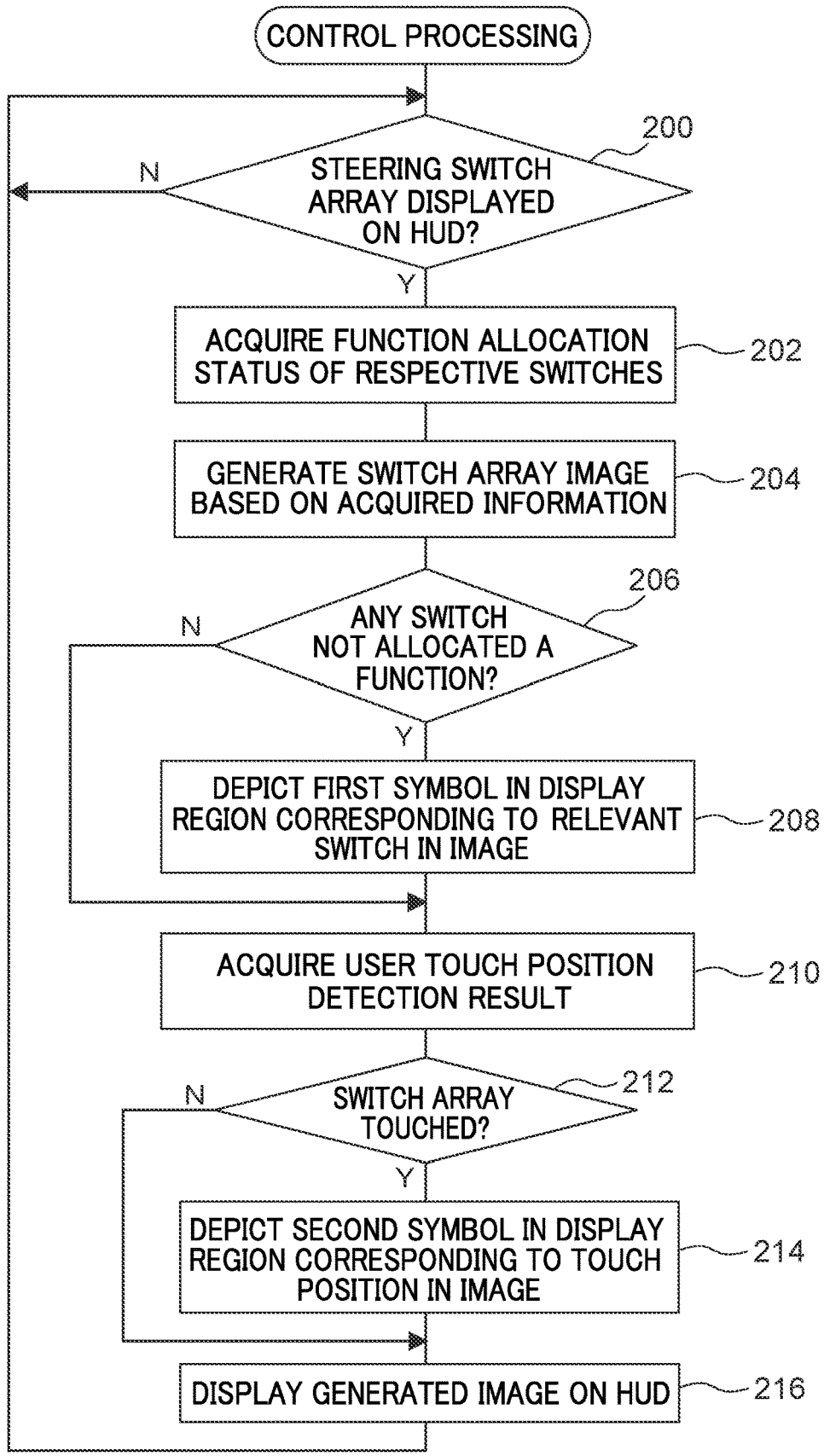

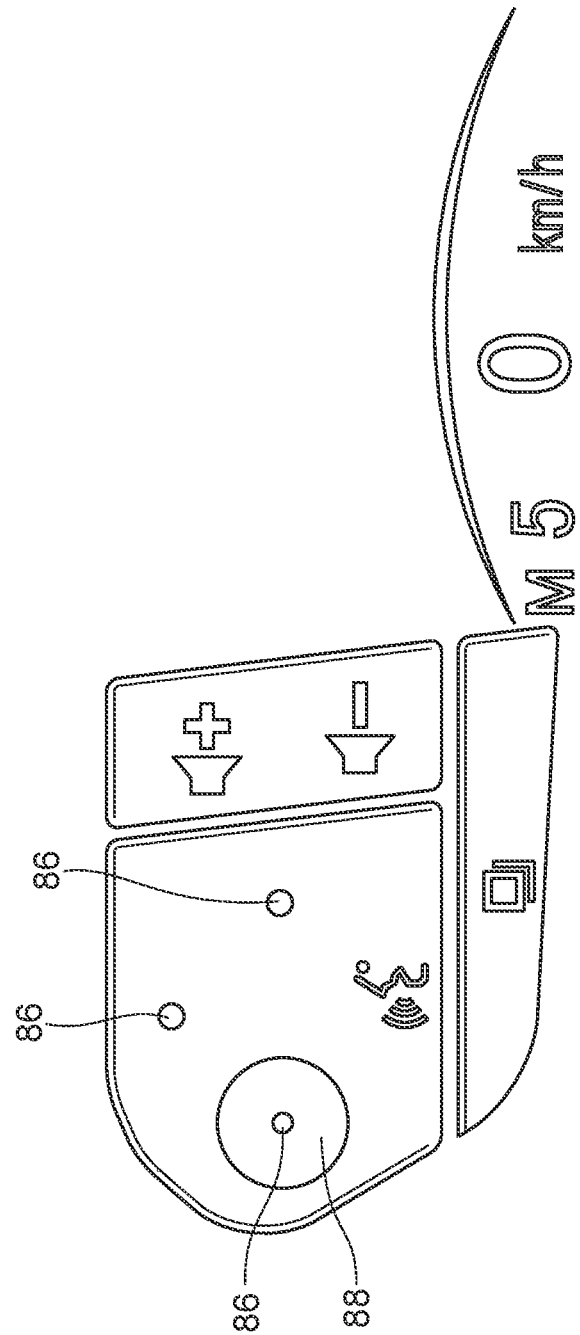

VEHICULAR DISPLAY CONTROL DEVICE, VEHICULAR DISPLAY DEVICE, VEHICULAR DISPLAY CONTROL METHOD, AND STORAGE MEDIUM

CROSS-REFERENCE TO RELATED APPLICATION

This application is based on and claims priority under 35 USC 119 from Japanese Patent Application No. 2021-133606 filed on Aug. 18, 2021, the disclosure of which is incorporated by reference herein.

BACKGROUND

Technical Field

The present disclosure relates to a vehicular display control device, a vehicular display device, a vehicular display control method, and a non-transitory storage medium storing a vehicular display control program.

RELATED ART

Japanese Patent Application Laid-Open (JP-A) No. 2021-075157 discloses technology in which a layout of a switch array provided to a steering wheel of a vehicle is displayed as an image on a head-up display (HUD).

Multifunction switches that are each capable of being freely allocated a press-implemented function may be included amongst the switch array provided to the steering wheel of the vehicle. Note that when an image of the switch array is to be displayed on a display device such as the HUD, if a multifunction switch that has not been allocated a function is not displayed, a user might wrongly assume that this multifunction switch is broken.

SUMMARY

In consideration of the above circumstances, the present disclosure provides a vehicular display control device, a vehicular display device, a vehicular display control method, and a non-transitory storage medium storing a vehicular display control program that are capable of assisting vehicle operation by a user by making the user aware when a multifunction switch has not been allocated a function and aware that this multifunction switch is operating normally.

A vehicular display control device according to a first aspect includes: a memory; and a processor coupled to the memory, the processor being configured to: acquire a function allocation status of a multifunction switch capable of being allocated any press-implemented function, in order to display an image of a switch array including the multifunction switch on a display device, and display a first symbol in a display region corresponding to the multifunction switch in the switch array image in a case in which the multifunction switch has not been allocated a press-implemented function.

In the first aspect, the function allocation status of the multifunction switch is acquired, and the first symbol is displayed in the display region corresponding to the multifunction switch in the switch array image in cases in which the multifunction switch has not been allocated a function. This enables a user to be made aware that the corresponding multifunction switch has not been allocated a function and is operating normally based on the first symbol displayed on the display device, and thereby enables vehicle operation by the user to be assisted.

A second aspect may be the first aspect, wherein the processor is further configured to: acquire a touch position touched by a user from a touch sensor for detecting the touch position provided to the switch array, in order to display the switch array image on the display device; and display a second symbol in a display region of a switch corresponding to the acquired touch position in the switch array image.

In the second aspect, the touch position touched by the user is acquired from the touch sensor for detecting the touch position provided to the switch array, and the second symbol is displayed in the display region of the switch corresponding to the acquired touch position in the switch array image. This enables the user to ascertain a sense of distance between the switch corresponding to the touch position and other switches based on the switch array image and the second symbol corresponding to the touch position that are displayed on the display device.

A third aspect may be the first aspect or the second aspect, wherein the switch array is provided to a steering wheel.

In the third aspect, the user is able to operate the switch array without having to lower their gaze to the switch array on the steering wheel by referring to the switch array image displayed on the display device.

A fourth aspect may be any one of the first aspect to the third aspect, wherein the display device is a head-up display.

In the fourth aspect, since the display device is an HUD, in a state in which the user is looking ahead of the vehicle through a windshield, the amount by which the user has to shift their gaze in order to view the image displayed on the display device may be reduced compared to cases in which the display device is a meter display or the like.

A fifth aspect of the disclosure is a vehicular display device that includes the vehicular display control device of any one of the first aspect to the fourth aspect, and a display device.

Since the fifth aspect includes the vehicular display control device of any one of the first aspect to the fourth aspect, the user may be made aware that the corresponding multifunction switch has not been allocated a function and is operating normally, similarly to in the first aspect.

A sixth aspect of the disclosure is a vehicular display control method including: acquiring a function allocation status of a multifunction switch capable of being allocated any press-implemented function, in order to display an image of a switch array including the multifunction switch on a display device; and displaying a first symbol in a display region corresponding to the multifunction switch in the switch array image in a case in which the multifunction switch has not been allocated a press-implemented function.

Similarly to the first aspect, the sixth aspect enables the user to be made aware that the corresponding multifunction switch has not been allocated a function and is operating normally, and thereby enables vehicle operation by the user to be assisted.

A seventh aspect of the disclosure is a non-transitory computer readable storage medium storing a program that causes a computer to execute vehicular display control processing, the vehicular display control processing including: acquiring a function allocation status of a multifunction switch capable of being allocated any press-implemented function in order to display an image of a switch array including the multifunction switch on a display device; and displaying a first symbol in a display region corresponding to the multifunction switch in the switch array image in cases in which the multifunction switch has not been allocated a press-implemented function.

Similarly to the first aspect, the seventh aspect enables the user to be made aware that the corresponding multifunction switch has not been allocated a function and is operating normally, and thereby enables vehicle operation by the user to be assisted.

The present disclosure enables the user to be made aware that the corresponding multifunction switch has not been allocated a function and is operating normally, and thereby enables vehicle operation by the user to be assisted.

BRIEF DESCRIPTION OF THE DRAWINGS

FIG. 5 is a diagram illustrating an enlarged section of a steering wheel;

FIG. 6 is a flowchart illustrating control processing executed by a display control ECU; and FIG. 7 is a concept diagram illustrating an example of an image of a switch array displayed on an HUD.

DETAILED DESCRIPTION

Figure 1:
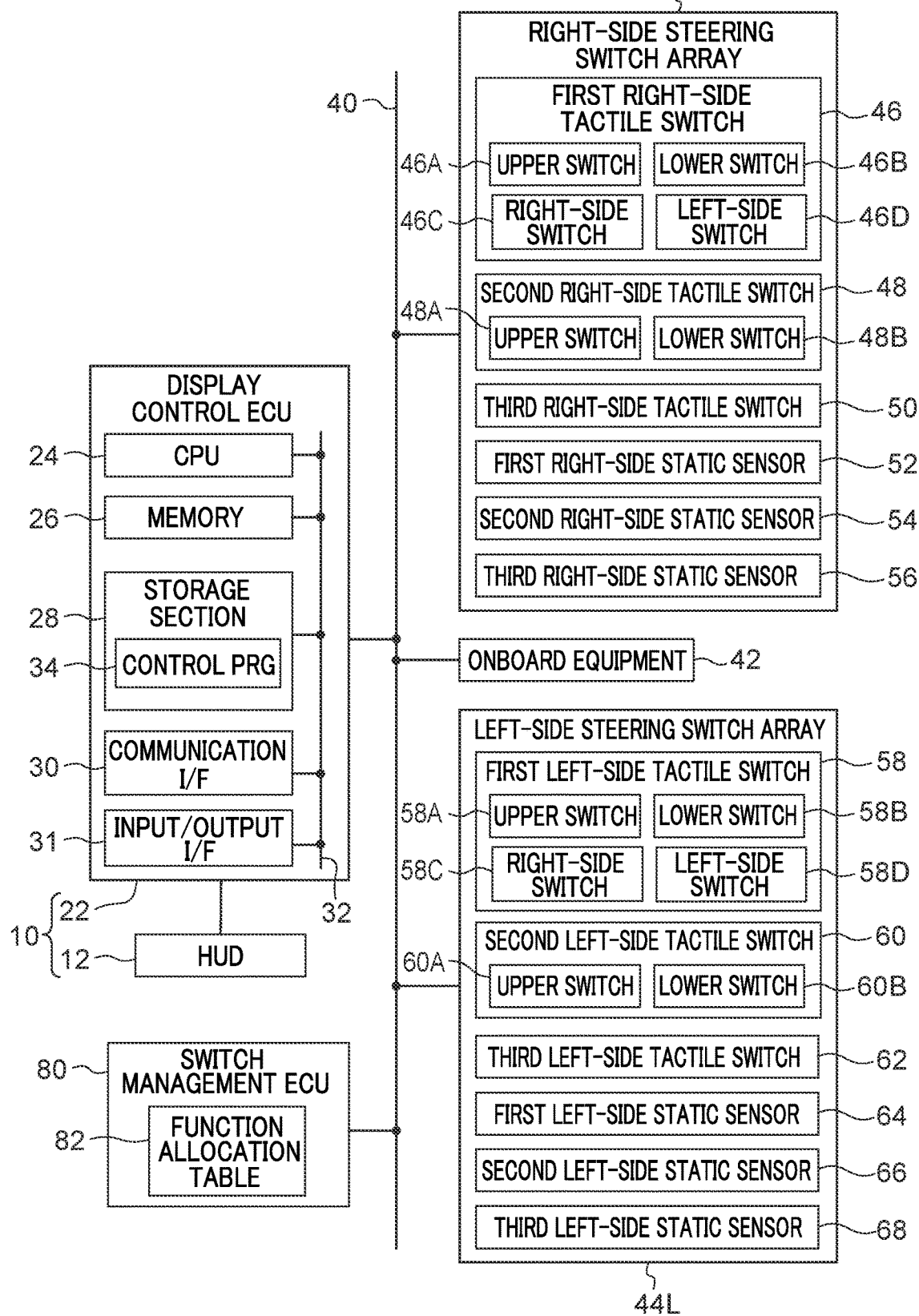
FIG. 1 is a block diagram illustrating a schematic configuration of a vehicular display device according to an exemplary embodiment and other relevant portions.

Detailed explanation follows regarding an example of an exemplary embodiment of the present disclosure, with reference to the drawings. FIG. 1 illustrates a vehicular display device 10 according to the present exemplary embodiment. The vehicular display device 10 is installed to a vehicle, and includes a head-up display (HUD) 12 serving as an example of a display device, and a display control electronic control unit (ECU) 22 that controls display of images by the LEAD 12. Note that the display control ECU 22 is an example of a vehicular display control device according to the present disclosure.

Figure 2:
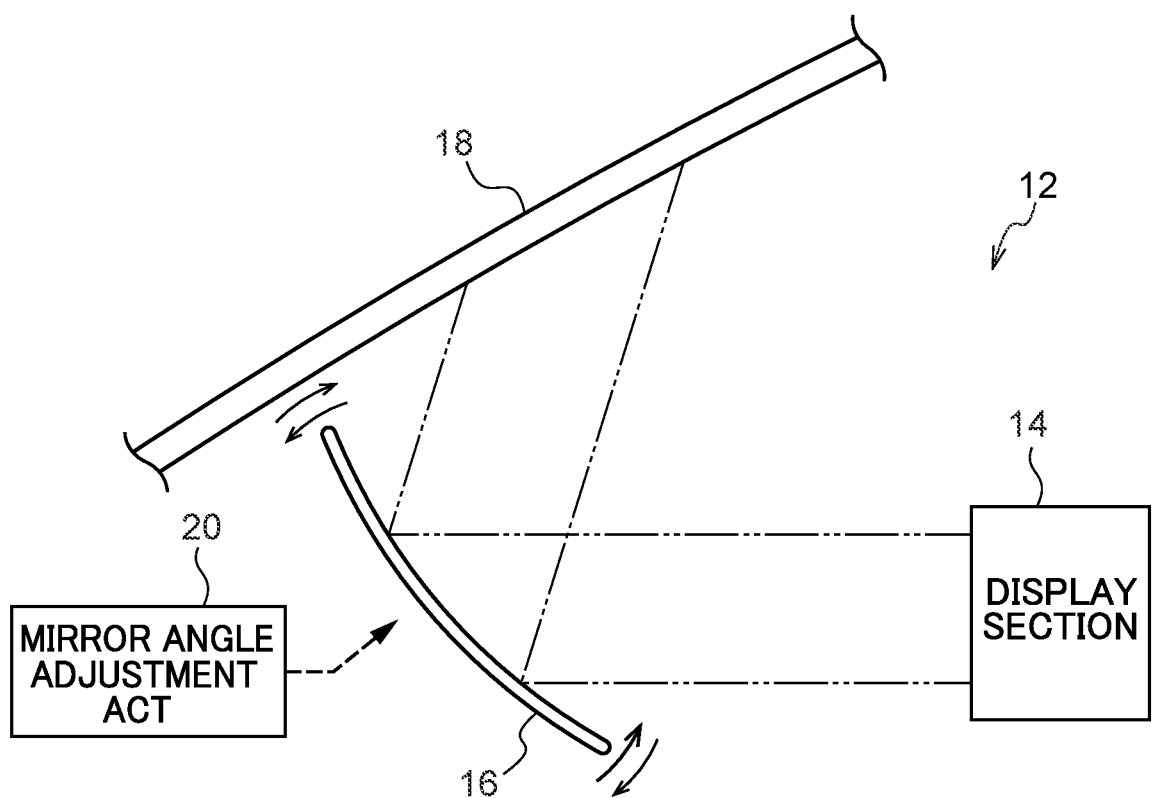
FIG. 2 is a schematic configuration diagram illustrating an example of a head-up display (HUD)

As illustrated in FIG. 2, the HUD 12 includes a display section 14 that emits a projection beam of a display image, a mirror 16 configured of a concave mirror that reflects and projects the projection beam emitted from the display section 14 onto a windshield 18 of the vehicle, and a mirror angle adjustment actuator (ACT) 20. Processing such as half silvering is performed on a vehicle cabin interior surface of a range 74 (see FIG. 4) where the display image is projected onto the windshield 18, such that a user is able to see the projected display image, and also able to see the scene outside the vehicle through the windshield 18. The mirror angle adjustment ACT 20 enables a projection position of the display image on the windshield 18 to be changed by adjusting the angle of the mirror 16.

As illustrated in FIG. 1, the display control ECU 22 includes a central processing unit (CPU) 24, and memory 26 such as read only memory (ROM) and random access memory (RAM). The display control ECU 22 also includes a non-volatile storage section 28 such as a hard disk drive (HDD) or a solid state drive (SSD), a communication interface (I/F) 30, and an input/output I/F 31. The CPU 24, the memory 26, the storage section 28, the communication I/F 30, and the input/output I/F 31 are connected so as to be capable of communicating with one another through an internal bus 32.

Figure 3:
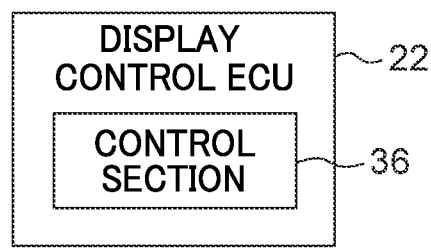
FIG. 3 is a functional block diagram illustrating a display control electronic control unit (ECU)

A control program 34 is stored in the storage section 28. The control program 34 is read from the storage section 28 and loaded in the memory 26, and the control program 34 loaded in the memory 26 is executed by the CPU 24, such that the display control ECU 22 functions as a control section 36 illustrated in FIG. 3.

When an image of a switch array (such as a steering switch array 44R or 44L, described later) including multifunction switches each capable of being freely allocated a press-implemented function is displayed on the HUD 12, the control section 36 performs the following processing. Namely, the control section 36 acquires a function allocation status of each of the multifunction switches, and displays a first symbol in a display region corresponding to a multifunction switch in the switch array image in cases in which this multifunction switch has not been allocated a function. Note that the control program 34 is an example of a vehicular display control program according to the present disclosure.

Note that the display control ECU 22 is connected to a system bus 40. Onboard equipment 42, a right-side steering switch array 44R, a left-side steering switch array 44L, and a switch management ECU 80 are connected to the system bus 40. In addition to equipment such as an air conditioner, an audio system, a car navigation system, and an audio input device, the onboard equipment 42 also includes equipment for travel assistance such as Adaptive Cruise Control (ACC) and Lane Tracing Assist (LTA).

Figure 4:
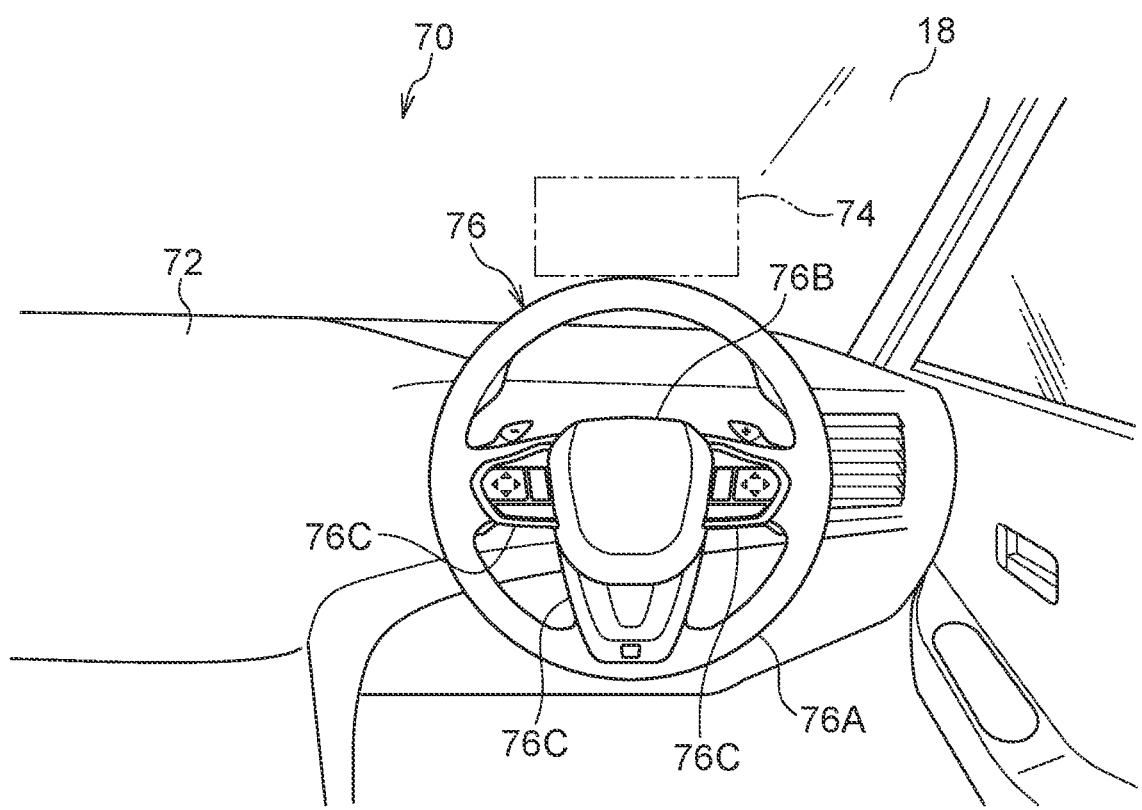
FIG. 4 is a perspective view illustrating a front section of a vehicle cabin of a vehicle as viewed from a vehicle rear side.

As illustrated in FIG. 4, an instrument panel 72 is installed at a front section of the vehicle cabin of a vehicle 70 equipped with the vehicular display device 10 according to the present exemplary embodiment. The windshield 18 is installed at a front end portion of the instrument panel 72, extends along a vehicle vertical direction and a vehicle width direction and partitions between the vehicle cabin interior and vehicle cabin exterior. A steering wheel 76 is provided to a driving seat side (i.e., vehicle right side) of the instrument panel 72 through a non-illustrated steering column. The steering wheel 76 includes a substantially circular ring-shaped rim 76A. A hub 76B, configuring a central section, is provided at an inner peripheral side of the rim 76A. The rim 76A and the hub 76B are coupled together by plural (e.g., three in the present exemplary embodiment) spokes 76C.

The spokes 76C are provided at three locations, these being between the right side of the rim 76A and the hub 76B, between the left side of the rim 76A and the hub 76B, and between the lower side of the rim 76A and the hub 76B. Note that the right-side steering switch array 44R is provided to the spoke 76C between the right side of the rim 76A and the hub 76B. Similarly, the left-side steering switch array 44L is provided to the spoke 76C between the left side of the rim 76A and the hub 76B.

The right-side steering switch array 44R includes a first right-side tactile switch 46, a second right-side tactile switch 48, and a third right-side tactile switch 50, each of which is configured by a contact detector switch. The right-side steering switch array 44R also includes a first right-side static sensor 52, a second right-side static sensor 54, and a third right-side static sensor 56. Note that the static sensors 52, 54, 56 are an example of touch sensors of the present disclosure.

As illustrated in FIG. 5, the first right-side tactile switch 46 has a substantially pentagonal shape with rounded corners, and includes an upper switch 46A, a lower switch 46B, a right-side switch 46C, and a left-side switch 46D. The first right-side tactile switch 46 is therefore configured so as to be capable of being pressed at upper, lower, left, and right sides.

The first right-side tactile switch 46 is further provided with the first right-side static sensor 52 that is capable of detecting whether a user seated in the driving seat of the vehicle (hereafter simply referred to as the "user") has touched the first right-side tactile switch 46. Specifically, the first right-side static sensor 52 is capable of detecting whether the user has touched any switch of the upper switch 46A, the lower switch 46B, the right-side switch 46C, or the left-side switch 46D of the first right-side tactile switch 46. Note that the upper switch 46A, the lower switch 46B, the right-side switch 46C, and the left-side switch 46D configure multifunction switches each capable of being freely allocated a press-implemented function.

When the steering wheel 76 is viewed face-on, the second right-side tactile switch 48 is installed adjacent to the left side of the first right-side tactile switch 46, is formed in a substantially rectangular shape with its length direction along the vehicle vertical direction, and includes an upper switch 48A and a lower switch 48B. Thus, the second right-side tactile switch 48 is configured so as to be capable of being pressed at upper and lower sides.

The second right-side tactile switch 48 is further provided with the second right-side static sensor 54 that is capable of detecting whether the user has touched the second right-side tactile switch 48. Specifically, the second right-side static sensor 54 is capable of detecting whether the user has touched any switch of the tipper switch 48A or the lower switch 48B of the second right-side tactile switch 48.

When the steering wheel 76 is viewed face-on, the third right-side tactile switch 50 is installed at the lower side of both the first right-side tactile switch 46 and the second right-side tactile switch 48, and is formed in a substantially rectangular shape with its length direction along the vehicle width direction. The third right-side tactile switch 50 is provided with the third right-side static sensor 56 that is configured so as to be capable of detecting whether the user has touched the third right-side tactile switch 50.

As illustrated in FIG. 1, the left-side steering switch array 44L includes a first left-side tactile switch 58, a second left-side tactile switch 60, and a third left-side tactile switch 62, each of which is configured by a contact detector switch. The left-side steering switch array 44L also includes a first left-side static sensor 64, a second left-side static sensor 66, and a third left-side static sensor 68. Note that the static sensors 64, 66, 68 are an example of touch sensors of the present disclosure.

As illustrated in FIG. 5, the first left-side tactile switch 58 has a substantially pentagonal shape with rounded corners, and includes an upper switch 58A, a lower switch 58B, a right-side switch 58C, and a left-side switch 58D. The first left-side tactile switch 58 is therefore configured so as to be capable of being pressed at upper, lower, left, and right sides.

The first left-side tactile switch 58 is further provided with the first left-side static sensor 64 that is capable of detecting whether the user has touched the first left-side tactile switch 58. Specifically, the first left-side static sensor 64 is capable of detecting whether the user has touched any switch of the upper switch 58A, the lower switch 58B, the right-side switch 58C, or the left-side switch 58D of the first left-side tactile switch 58. Note that the upper switch 58A, the lower switch 58B, the right-side switch 58C, and the left-side switch 58D configure multifunction switches each capable of being freely allocated a press-implemented function.

When the steering wheel 76 is viewed face-on, the second left-side tactile switch 60 is installed adjacent to the right side of the first left-side tactile switch 58, is formed in a substantially rectangular shape with its length direction along the vehicle vertical direction, and includes an upper switch 60A and a lower switch 60B. Thus, the second left-side tactile switch 60 is configured so as to be capable of being pressed at upper and lower sides.

The second left-side tactile switch 60 is further provided with the second left-side static sensor 66 that is capable of detecting whether the user has touched the second left-side tactile switch 60. Specifically, the second left-side static sensor 66 is capable of detecting whether the user has touched any switch of the tipper switch 60A or the lower switch 60B of the second left-side tactile switch 60.

When the steering wheel 76 is viewed face-on, the third left-side tactile switch 62 is installed at the lower side of both the first left-side tactile switch 58 and the second left-side tactile switch 60, and is formed in a substantially rectangular shape with its length direction along the vehicle width direction. The third left-side tactile switch 62 is provided with the third left-side static sensor 68 that is capable of detecting whether the user has touched the third left-side tactile switch 62.

Although not illustrated in the drawings, the switch management ECU 80 illustrated in FIG. 1 includes a CPU, memory, a non-volatile storage section, a communication I/F, and so on, similarly to the display control ECU 22. A function allocation table 82 registered with the functions allocated to the respective switches of the steering switch arrays 44R, 44L is stored in the storage section of the switch management ECU 80. When any switch of the steering switch arrays 44R, 44L is pressed, the switch management ECU 80 reads the function allocated to this pressed switch from the function allocation table 82. The switch management ECU 80 then notifies the item of onboard equipment 42 corresponding to this read function that execution of the read function has been instructed by pressing the corresponding switch.

Note that in the right-side steering switch array 44R, the switches 46A to 46D of the first right-side tactile switch 46 configure multifunction switches each capable of being freely allocated a press-implemented function. Similarly, in the left-side steering switch array 44L, the switches 58A to 58D of the first left-side tactile switch 58 also configure multifunction switches. In the present exemplary embodiment, examples of functions that may be allocated to the multifunction switches include audio setting adjustment functions (such as switching the power on and off, fast-forwarding and rewinding, adjusting the volume, and switching operation modes), telephone communication functions, air conditioner setting adjustment functions (such as adjusting the temperature, airflow, and blower outlets, switching an autonomous mode on and off, and switching between recirculated air and outside air).

Whenever an instruction to allocate a press-implemented function to any switch out the switches 46A to 46D or switches 58A to 58D is input by the user through the steering switch arrays 44R, 44L or the like, the switch management ECU 80 updates the function allocation table 82 according to this input instruction. Note that in the present exemplary embodiment, the default is that none of the multifunction switches are allocated a press-implemented function. Thus, in certain vehicles 70, a switch that has not been allocated a press-implemented function may still be present amongst the switches 46A to 46D and switches 58A to 58D.

Next, explanation follows regarding control processing serving as operation of the present exemplary embodiment, executed by the display control ECU 22 while an ignition switch of the vehicle 70 is on, with reference to FIG. 6.

At step 200 of the control processing, the control section 36 determines whether or not an image of at least one switch array of the switch arrays 44R, 441L is displayed on the HUD 12. In the present exemplary embodiment as an example, in cases in which any switch of the switch array 44R is being touched by the user, an image of the switch array 44R is displayed on the HUD 12. Similarly, in cases in which any switch of the switch array 44L is being touched by the user, an image of the switch array 44L is displayed on the HUD 12.

Thus, in cases in which none of the switches of the switch array 44R and the switch array 44L are being touched by the user, a negative determination is made at step 200, processing returns to step 200, and the determination of step 200 is repeated. In such cases, no image of the switch arrays 44R, 44L is displayed on the HUD 12. On the other hand, in cases in which at least one switch of the switch arrays 44R, 44L is being touched, an affirmative determination is made at step 200 and processing transitions to step 202. In such cases, an image of whichever switch array 44 is being touched of the switch arrays 44R, 44L is set as a display target.

Note that after this image of the touched switch array 44 has been temporarily displayed on the HUD 12, display of this image may be removed as soon as this touch-contact is released, or display of this image may be removed at a timing when a predetermined duration has elapsed since the touch-contact was released.

At step 202, the control section 36 acquires information (information registered in the function allocation table 82) from the switch management ECU 80 indicating a function allocation status of the respective switches of the display target switch array (at least one switch array of the switch arrays 44R, 44L).

At step 204, the control section 36 generates an image of the display target switch array (the at least one switch array of the switch arrays 44R, 44L) based on the information acquired at step 202. Namely, first, the control section 36 reads data regarding an image representing the display target switch array 44 from the storage section 28 or the like. At this stage, the read image does not depict any icons, text, or the like in display regions corresponding to the respective switches.

Next, for each switch that has been allocated a press-implemented function of the respective switches of the display target switch array 44, the control section 36 depicts at least one of an icon or text corresponding to the allocated function in the display region corresponding to this switch. As an example, FIG. 7 illustrates a state in which the display target switch array is the switch array 44L, and icons corresponding to the allocated functions are depicted in the display regions corresponding to the lower switch 58B, the upper switch 60A, the lower switch 60B, and the third left-side tactile switch 62 of the switch array 44L.

Next, at step 206, the control section 36 determines whether or not any switch that has not been allocated a press-implemented function is present amongst the respective switches of the display target switch array 44. In cases in which a negative determination is made at step 206, processing transitions to step 210. In cases in which an affirmative determination is made at step 206, processing transitions to step 208.

At step 208, the control section 36 depicts a first symbol 86 (see FIG. 7) in the display region corresponding to the switch that has not been allocated a press-implemented function. In the present exemplary embodiment, a circular symbol with a surface area no greater than a first predetermined value is employed as the first symbol 86. As an example, FIG. 7 illustrates a state in which the display target switch array is the switch array 44L, and first symbols 86 are depicted in respective display regions corresponding to the upper switch 58A, the right-side switch 58C, and the left-side switch 58D of the switch array 44L.

At step 210, the control section 36 acquires a touch position detection result from the static sensors provided to the display target switch array 44 regarding whether any position on the display target switch array 44 has been touched by the user. At step 212, the control section 36 determines whether or not the user has touched the display target switch array 44 based on the touch position detection result acquired at step 210. In cases in which a negative determination is made at step 212, processing transitions to step 216.

In cases in which an affirmative determination is made at step 212, processing transitions to step 214. At step 214, the control section 36 depicts a second symbol 88 (see FIG. 7) in the display region corresponding to the touch position. In the present exemplary embodiment, a circular symbol with a surface area no less than a second predetermined value (wherein the second predetermined value first predetermined value) is employed as the second symbol 88. As an example, FIG. 7 illustrates a state in which the display target switch array is the switch array 44L, and the second symbol 88 is depicted in the display region corresponding to the right-side switch 58C the switch array 44L.

At step 216, the control section 36 combines an image generated by the above-described processing (an image representing the display target switch array 44) with other images displayed on the HUD 12 (such as images indicating the vehicle speed and shift position as illustrated in FIG. 7). The combined images are then displayed on the HUD 12. After the processing of step 216, processing returns to step 200.

In the above-described control processing, when the user touches either the switch array 44R or the switch array 44L, an image representing the touched switch array 44 is displayed on the HUD 12. In this image, the first symbol 86 is displayed in the display region corresponding to any switch that has not been allocated a press-implemented function. This enables the user to be made aware that the switch that corresponds to the display region where the first symbol 86 is displayed in the touched switch array 44 has not been allocated a function and is operating normally.

Moreover, the second symbol 88 is displayed in the display region corresponding to a switch being touched by the user in the image displayed on the HUD 12. Moreover, when the position touched by the user shifts from one (first) switch to another (second) switch, the display position of the second symbol 88 also shifts from the display region corresponding to the one switch to the display region corresponding to the other switch. This enables the user to ascertain a sense of distance between the switch corresponding to the touch position and other switches.

As described above, in the present exemplary embodiment, the control section 36 acquires the function allocation status of respective multifunction switches each capable of being freely allocated a press-implemented function when an image of a switch array 44 including the multifunction switches is to be displayed on the HUD 12, and displays the first symbol 86 in the display region corresponding to a multifunction switch in the image of the switch array 44R in cases in which this multifunction switch has not been allocated a function. This enables the user to be made aware that the corresponding multifunction switch has not been allocated a function and is operating normally based on the first symbol displayed on the HUD 12.

Moreover, in the present exemplary embodiment, the control section 36 acquires the touch position touched by the user from the touch sensor for detecting the touch position provided to the switch array 44 when the image of a switch array 44 is to be displayed on the HUD 12, and displays the second symbol 88 in the display region of the switch corresponding to the acquired touch position in the image of the switch array 44. This enables the user to ascertain a sense of distance between the switch corresponding to the touch position and other switches based on the switch array image and the second symbol 88 corresponding to the touch position that are displayed on the HUD 12.

Moreover, in the present exemplary embodiment, the switch arrays 44 are provided to the steering wheel 76. This enables the user to operate the switch arrays 44 without having to lower their gaze to the switch arrays 44 on the steering wheel 76 by referring to the image of the corresponding switch array 44 displayed on the HUD 12.

Moreover, in the present exemplary embodiment, the HUD 12 is employed as a display device. Thus, in a state in which the user is looking ahead of the vehicle through the windshield 18, the amount by which the user has to shift their gaze in order to view the image displayed on the display device may be reduced compared to cases in which the display device is a meter display or the like.

Note that although the first symbol 86 has a circular form in the above description, there is no limitation thereto. The first symbol 86 may take another form, such as a shape with N angles (wherein N≥3), or a diagonal cross or a star shape. Similarly, the second symbol 88 is not limited to a circular form, and may take another form.

Moreover, although a case has been described in which the switch arrays 44 provided to the steering wheel 76 are employed as an example of a switch arrays including multifunction switches in the present disclosure, there is no limitation thereto. A switch array including a multifunction switch may for example be switches provided to the instrument panel 72.

Moreover, although a case has been described in which the HUD 12 is employed as an example of a display device of the present disclosure, the present disclosure is not limited thereto. The display device of the present disclosure may be another display such as a meter display.

Moreover, a case has been described in which the control program 34 that is an example of a vehicular display control program according to the present disclosure is pre-stored (installed) in the storage section 28. However, the vehicular display control program according to the present disclosure may be provided in a format recorded in a non-transitory recording medium such as an HDD, an SSD, or a DVD.

What is claimed is:

1. A vehicular display control device comprising:
   a memory; and
   a processor coupled to the memory, the processor being configured to:
      acquire a function allocation status of one or more multifunction switches capable of being allocated any press-implemented function,
      display an image of a switch array including the one or more multifunction switches on a display device,
      in a case in which there is a multifunction switch to which a press-implemented function has not been allocated, display a first symbol in a display region corresponding to the multifunction switch in the switch array image, the first symbol indicating that a press-implemented function has not been allocated to the multifunction switch,
      acquire a touch position touched by a user from a touch sensor for detecting the touch position provided to the switch array, in order to display the switch array image on the display device,
      display a second symbol in a display region of a switch corresponding to the acquired touch position in the switch array image,
      acquire a movement of the touch position from the touch sensor, and
      move the second symbol to a display region corresponding to the moved touch position in the switch array image,
   wherein the first symbol comprises a circular symbol having a surface area no greater than a first predetermined value, and the second symbol comprises a circular symbol having a surface area no less than a second predetermined value, where the second predetermined value>first predetermined value.

2. The vehicular display control device of claim 1, wherein the switch array is provided to a steering wheel.

3. The vehicular display control device of claim 1, wherein the display device is a head-up display.

4. A vehicular display device comprising:
   the vehicular display control device of claim 1; and
   a display device.

5. The vehicular display control device of claim 1, wherein the image of the switch array includes depictions respectively representing the one or more multifunction switches.

6. The vehicular display control device of claim 1, wherein the second symbol moves corresponding to the movement of the touch position of the user.

7. The vehicular display control device of claim 1, wherein in a case in which the touch position touched by the user and detected by the touch sensor is at the multifunction switch to which a press-implemented function has not been allocated, display the first symbol being superimposed on the second symbol at the display region corresponding to the touch position in the switch array image.

8. A vehicular display control method comprising:
   acquiring a function allocation status of one or more multifunction switches capable of being allocated any press-implemented function;
   displaying an image of a switch array including the one or more multifunction switches on a display device;
   in a case in which there is a multifunction switch to which a press-implemented function has not been allocated, displaying a first symbol in a display region corresponding to the multifunction switch in the switch array image, the first symbol indicating that a press-implemented function has not been allocated to the multifunction switch;
   acquiring a touch position touched by a user from a touch sensor for detecting the touch position provided to the switch array, in order to display the switch array image on the display device;
   displaying a second symbol in a display region of a switch corresponding to the acquired touch position in the switch array image;

acquiring a movement of the touch position from the touch sensor; and moving the second symbol to a display region corresponding to the moved touch position in the switch array image, wherein the first symbol comprises a circular symbol having a surface area no greater than a first predetermined value, and the second symbol comprises a circular symbol having a surface area no less than a second predetermined value, where the second predetermined value>first predetermined value.

9. A non-transitory computer readable storage medium storing a program that causes a computer to execute vehicular display control processing, the vehicular display control processing comprising:

acquiring a function allocation status of one or more multifunction switches capable of being allocated any press-implemented function;

displaying an image of a switch array including the one or more multifunction switches on a display device;

in a case in which there is a multifunction switch to which a press-implemented function has not been allocated, displaying a first symbol in a display region corresponding to the multifunction switch in the switch array image, the first symbol indicating that a press-implemented function has not been allocated to the multifunction switch;

acquiring a touch position touched by a user from a touch sensor for detecting the touch position provided to the switch array, in order to display the switch array image on the display device;

displaying a second symbol in a display region of a switch corresponding to the acquired touch position in the switch array image;

acquiring a movement of the touch position from the touch sensor; and moving the second symbol to a display region corresponding to the moved touch position in the switch array image, wherein the first symbol comprises a circular symbol having a surface area no greater than a first predetermined value, and the second symbol comprises a circular symbol having a surface area no less than a second predetermined value, where the second predetermined value>first predetermined value.

\* \* \* \* \*